C. CHADWICK.
CONVERTING RECIPROCATING INTO ROTARY MOTION.
No. 191,655. Patented June 5, 1877.
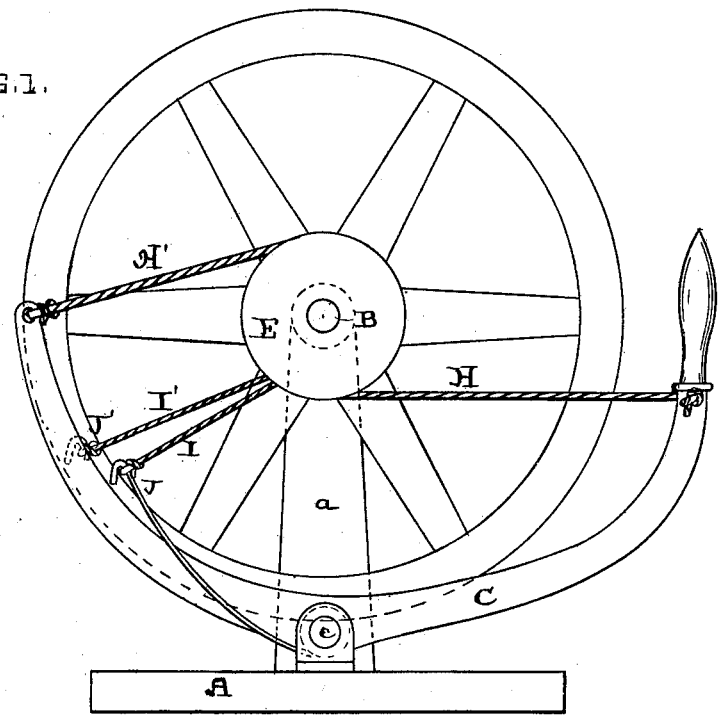
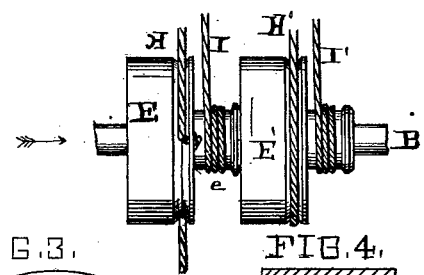
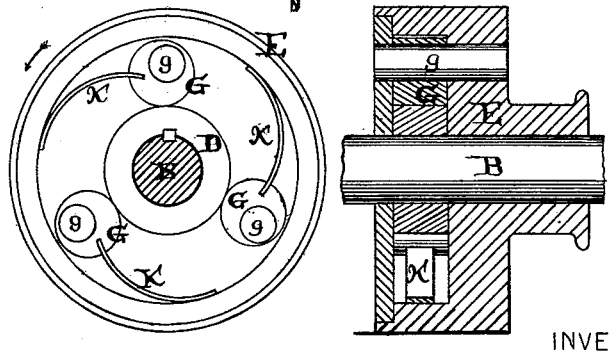
ATTEST:
Thos. L. Imes
Paul Bakewell
INVENTOR,
Chas. Chadwick
By Chas. D. Moody.
his atty.

UNITED STATES PATENT OFFICE

CHARLES CHADWICK, OF HANNIBAL, MISSOURI, ASSIGNOR OF ONE-HALF HIS RIGHT TO PETER B. GROAT, OF SAME PLACE.

IMPROVEMENT IN CONVERTING RECIPROCATING INTO ROTARY MOTION.

Specification forming part of Letters Patent No. 191,655, dated June 5, 1877; application filed March 24, 1877.

*To all whom it may concern:*

Be it known that I, CHARLES CHADWICK, of Hannibal, Missouri, have made a new and useful Improvement in Converting Reciprocating into Rotary Motion, of which the following is a full, clear, and exact description, reference being had to the annexed drawing, making part of this specification, in which—

Figure 1 is a side elevation of a device containing the improvement; Fig. 2, a plan, showing the parts immediately connected with the shaft; Fig. 3, an end view of the parts shown in Fig. 2, in the direction of the arrow, the side of the casing being removed; and Fig. 4, a cross-section of one of the casings and the mechanism therein contained.

Similar letters indicate similar parts.

The present construction is a modification of that shown in an accompanying application.

The frame A, shaft B, lever C, casings E E', cords H H' I I', and springs J J' are the same as in the construction referred to, for the present improvement relates more especially to the peculiar means for transmitting the reciprocating movement of the casings into the rotative movement of the shaft, and which are contained within the casing. D represents a collar or boss that is keyed to the shaft, and whose periphery is circular. G G G represent one or more cam-wheels pivoted on studs $g$ $g$ $g$ projecting from the casing. The wheels are shaped and arranged to bear upon and move the collar D when the casing is turned in the direction of the projection of the cam, and as is indicated by the arrow in Fig. 3, but to slide on the collar without moving it when the casing is turned in the opposite direction. F F F represent springs arranged to keep the cam-wheels from bearing upon the collar when the casing is being turned backward.

Now, the proper reciprocating movement being imparted to the lever, the casings E E' are alternately turned partly around in a forward direction and then backward again, as in the construction referred to. As either casing is turned forward the cam-wheels are brought to bear upon the collar, causing the shaft B to turn, and as one casing and its cam-wheels are acting upon the shaft the other casing is, by means of the cords I I' and springs J J', being turned backward to its original position, and the rotary movement of the shaft thus made continuous.

A special advantage of this construction is that the cam-wheels are always in position to act promptly as the casings are turned forward, and no motion is lost.

I claim—

The combination of the shaft B, lever C, collars D, casings E E', cam-wheels G G G, cords H H' I I', and springs J J', substantially as shown and described.

CHAS. CHADWICK.

Witnesses:
J. A. JOHNSON,
P. H. KNIGHTON.